May 22, 1923.
J. L. DOWNS
1,455,868
LUBRICATOR
Filed Dec. 22, 1921
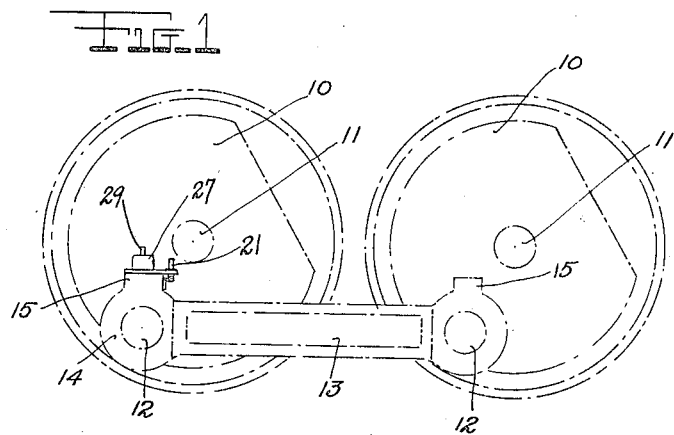
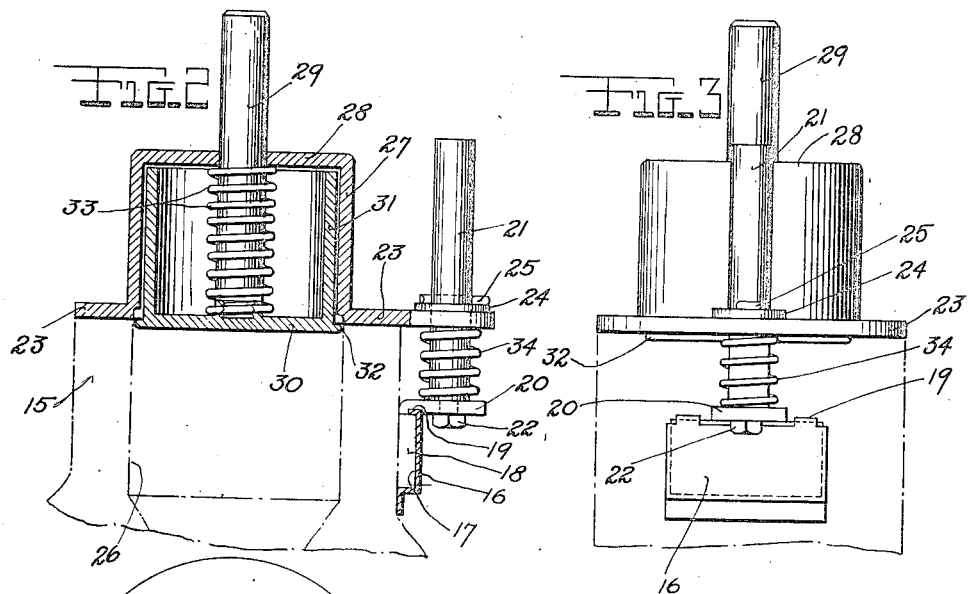
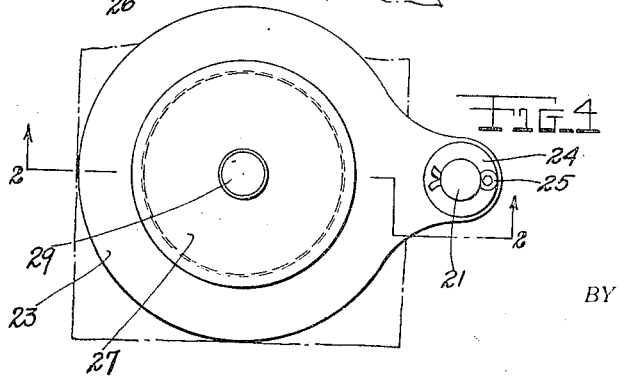
INVENTOR
James L. Downs
ATTORNEY Patented May 22, 1923.

1,455,868

UNITED STATES PATENT OFFICE.

JAMES L. DOWNS, OF NEW YORK, N. Y.

LUBRICATOR.

Application filed December 22, 1921. Serial No. 524,112.

*To all whom it may concern:*

Be it known that I, JAMES L. DOWNS, a citizen of the United States, residing at New York, in the county of the Bronx and State of New York, have invented certain new and useful Improvements in Lubricators, of which the following is a specification.

This invention relates to lubricators and has particular reference to a device peculiarly adapted for use on machines where constant changing of direction of its moveable members would be likely to throw off or otherwise render inefficient any of the present day forms of lubricators. This invention, moreover, constitutes an improvement upon the grease cup shown in my application for patent bearing Serial Number 498,858 filed Sept. 6, 1921.

Another object is to present a lubricator which can be quickly and readily attached to any desired location on a machine, and can be swung out of the way when it is desired to refill the grease cup.

Still another object is to provide a device which, when in place, will exert a constant positive pressure on the grease within, thereby insuring constant lubrication of crank shafts and the like without the necessity of applying more complicated registering or indicating means.

These and other objects will become apparent in the following description in which similar characters of reference refer to like-named parts in the drawing.

Briefly describing the several views of the drawing, Figure 1 represents a pair of locomotive drive wheels joined by a connecting rod which has my lubricator in place at one of the bearings.

Figure 2 is a sectional elevation taken on line 2—2 of Figure 4.

Figure 3 is an end elevational view of the lubricator.

Figure 4 is a top plan view of the same.

Referring now in detail to the drawing, the numeral 10 indicates locomotive drive wheels rotatable about the center axles 11 and having their eccentric centers 12 joined by the connecting rod 13. Obviously, as one of the drive wheels is rotated, an identical motion will be imparted to the second one by reason of the connecting rod 13, the latter, when operating constantly, changing its position but always remaining in a horizontal plane, following one eccentric center and guiding the other.

Bearing ends 14 of the connecting rod 13 are provided with projections 15 to which my lubricator is secured.

In attaching the device to the connecting rod, a cradle 16, rectangular in shape, forms a recess 17, and is preferably welded to the side wall of projection 15. A plate 18 is inserted and secured in the recess 17 by bending lips 19 of the cradle over the upper edge of the same. A support plate 20 formed integral with member 18 extends angularly therefrom and forms a support for the vertical swivel stud 21. The latter is preferably secured in place on member 20 by a bolt 22, providing a ready means for detaching the entire lubricator from the connecting rod when replacement or the like is desired.

After stud 21 has been located, flange 23, having a hole therein, is slipped over the stud 21 and secured in place as indicated in Figures 2 and 3, by a washer 24 and cotter pin 25. The flange 23 is of a dimension which will allow it to cover the grease chamber 26 in connecting rod projection 15. Flange 23 has an enclosed shell 27 formed thereon, the latter adapted to lie in a position coincident with the grease chamber 26. A guide stem 29 passes thru a hole in roof 28 and has a piston composed of flat head 30 and relatively wide annular side wall 31 threadably secured to its lower end. The lower corner of the piston is provided with rounded shoulder 32, which intimately contacts the walls of grease chamber 26.

It is obvious from Figure 2 that expansion spring 32, retained on stem 29, will urge the piston downward into the grease chamber 26, thereby pushing the grease into the bearing under a constant pressure. Filling the grease cup is accomplished in the same manner as shown on my previous application, Serial Number 498,858. A spring 34 retained on stud 21 yieldably urges flange 23 into contact with the surface of the connecting rod projection 15. When refilling grease cup 26, member 29 is withdrawn and the entire flange is rotated about the stud 21, until the grease cup 26 is exposed. After being filled with grease, the lubricator can again be located in place by rotating it back to its original position.

I claim:

A lubricating grease cup attachment comprising in combination with a grease cup having an open cylindrical top, of a support detachably engaged with the cup at one side thereof, a stud fixed in said support, a circular plate having a projection rotatably mounted on said post, a compression spring interposed between said support and plate projection encircling said stud, means for retaining the projection on said stud, said plate being registerable with the open upper end of the grease cup, a cylinder formed with said plate having a closed outer end, the inner portion of said cylinder agreeing with the opening in said cup, a guide stem passing axially through said cylinder, a head in which said stem is fixed, said head being adapted to enter the grease cup, an annular guide formed with said head extending into said cylinder, and a coiled compression spring encircling said stem abutting the closed end of said cylinder and said head respectively.

In witness whereof I affix my signature.

JAMES L. DOWNS.